SURFACE-WAVE FILTER REFLECTION CANCELLATION

Filed Feb. 28, 1968 2 Sheets-Sheet 1

INVENTOR.
Adrian J. DeVries
BY John J. Pederson
Attorney

INVENTOR.
Adrian J. DeVries
BY
[signature]
Attorney

United States Patent Office 3,559,115

Patented Jan. 26, 1971

3,559,115

SURFACE-WAVE FILTER REFLECTION CANCELLATION

Adrian J. DeVries, Elmhurst, Ill., assignor to Zenith Radio Corporation, Chicago, Ill., a corporation of Delaware Filed Feb. 28, 1968, Ser. No. 708,913
Int. Cl. H03h 9/32
U.S. Cl. 333—72 9 Claims

ABSTRACT OF THE DISCLOSURE

Undesired time-delayed and reduced-amplitude output signal components, due to reflected surface waves arriving at the output transducer of an acousto-electric surface-wave filter, are substantially inhibited or essentially cancelled by connecting two or more acousto-electric surface-wave filters in series. For the case of two filters in series, different effective intertransducer spacings are employed so that the second filter produces compensating reflected signal components which are equal in magnitude but counterphased with the reflected signal components produced in the first filter. These second-filter-reflected components effectively cancel the first-filter components when the two are combined in the second filter, resulting in an output signal which is relatively free from any spurious components due to reflected surface waves in the filter system. The required different effective spacings are provided either by using different actual spacings or by providing for different acoustic wave propagation velocities in the different stages. Similar compensation may be obtained in a system consisting of three or more filters.

BACKGROUND OF THE INVENTION

This invention pertains to solid-state circuitry.

It is known that an electrode array composed of a pair of inter-leaved comb-shaped electrodes of conductive elements (teeth) at alternating potentials, when coupled to a piezoelectric medium, produces acoustic surface waves on the medium. In the simplified embodiment of a piezoelectric ceramic wafer polarized perpendicularly to the propagating surface, the waves travel at right angles to the electrode elements; in crystalline materials, the waves may travel at an acute angle to the elements, the particular angle in a given case being a function of the crystallography of the material relative to the configuration of the array.

The surface waves are converted back into an electrical signal by a similar array of conductive teeth coupled to the piezoelectric medium and spaced from the input electrode array. In principle, the tooth pattern is analogous to an antenna array. Consequently similar signal selectivity is possible, thereby eliminating the need for the critical and/or much larger and more cumbersome components normally associated with selective circuitry. Thus, this device, with its small size, is particularly useful in conjunction with solid-state functional integrated circuitry where signal selectivity is desired.

Present acousto-electric signal-translating devices, also known as surface-wave filters, have a finite distance between the input and output transducers. Consequently, a finite time is required for an acoustic surface-wave signal to travel along the path from the input transducer to the output transducer. At the output transducer, part of the acoustic wave energy is converted to electrical energy and delivered to the load, part of the acoustic wave energy is transmitted past the transducer, and part of the acoustic wave energy is reflected back along the original path toward the input transducer. This reflected surface wave, which is identical in frequency to the original surface wave but smaller in magnitude, intercepts the input transducer where it is again similarly reflected, further attenuated in amplitude, back along the same path toward the output transducer resulting in a diminished replica of the original surface-wave signal at the output transducer. As a result, this diminished replica of the original surface-wave signal arrives at the output transducer later than the original surface-wave signal, the time delay being equal to twice the time required for a surface-wave signal to traverse the path from the input transducer to the output transducer.

The effect of these reflected signals due to the spacing between the input and output transducers varies with the amount of time delay. If these units are used, for example, as signal-selective devices in a television intermediate-frequency amplifier, the reflected signal components appear as "ghosts" in the picture and make it highly undesirable if not completely unacceptable for normal viewing.

Known methods for approaching this problem include selecting a value of output load impedance such that the maximum amount of electrical signal is transferred from the output transducer to the load impedance. However, enough acoustic energy remains in the medium to create a first-order reflected signal at the output of the device which is too large to be negligible.

Another conventional method used to reduce these reflections is to deposit some surface-wave-attenuating material between the transducers. When a reflected surface wave reaches the output transducer, it has traversed the path between the transducers twice. In addition to being smaller than the original surface wave from which it came, it also has been attenuated twice as much as the original surface wave which traversed the path only once. The magnitude of the reflected wave is therefore significantly reduced relative to the magnitude of the original surface wave. This method is necessarily inefficient because of the attenuation of the desired surface wave.

Still another method for approaching this problem is to reduce the time delay, which is directly proportional to the distance between the input transducer and the output transducer, by placing the output transducer in close proximity to the input transducer. This approach, however, rapidly reaches a point of diminishing returns because the direct cross-talk becomes large as the output transducer is positioned close to the input transducer. That is, with close input-output spacings, the input transducer and the output transducer are inherently coupled inductively and/or capacitively as well as acoustically through the piezoelectric medium, resulting in a loss of signal selectivity at the output of the device.

It is therefore an important object of the invention to devise a new and improved surface-wave filter in which the output signal is relatively free from undesired reflected signals.

It is a more specific object of the invention to accomplish this elimination of the effects of the undesired reflected signals in a convenient manner without having to use complex external circuits or devices.

SUMMARY OF THE INVENTION

A multi-stage solid state signal-translating system constructed in accordance with the invention comprises acoustically isolated first and second tuned acousto-electric filter stages each comprising an input transducer coupled to an acoustic-wave-propagating medium and responsive to an applied electrical signal of a predetermined center frequency for establishing acoustic waves of a predetermined acoustic wavelength in the medium. Each filter stage further comprises an output transducer coupled to the medium and spaced from its associated input transducer in the direction of acoustic wave propagation therein. Each output transducer is responsive to acoustic waves in the medium for developing an electrical signal corresponding thereto. Coupling means are also provided for impressing the electrical signals developed by the output transducer of the first filter stage on the input transducer of the second filter stage. The input and output transducers of the second filter stage have an effective spacing in the direction of acoustic wave propagation of a distance differing from the effective spacing between the input and output transducers of the first filter stage by an amount not integrally related to one-half the acoustic wavelength to provide substantial attenuation of spurious signal components attributable to acoustic wave reflections in the filter stages.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

DESCRIPTION OF THE PREFERRED EMBODIMENTS

Figure 1:
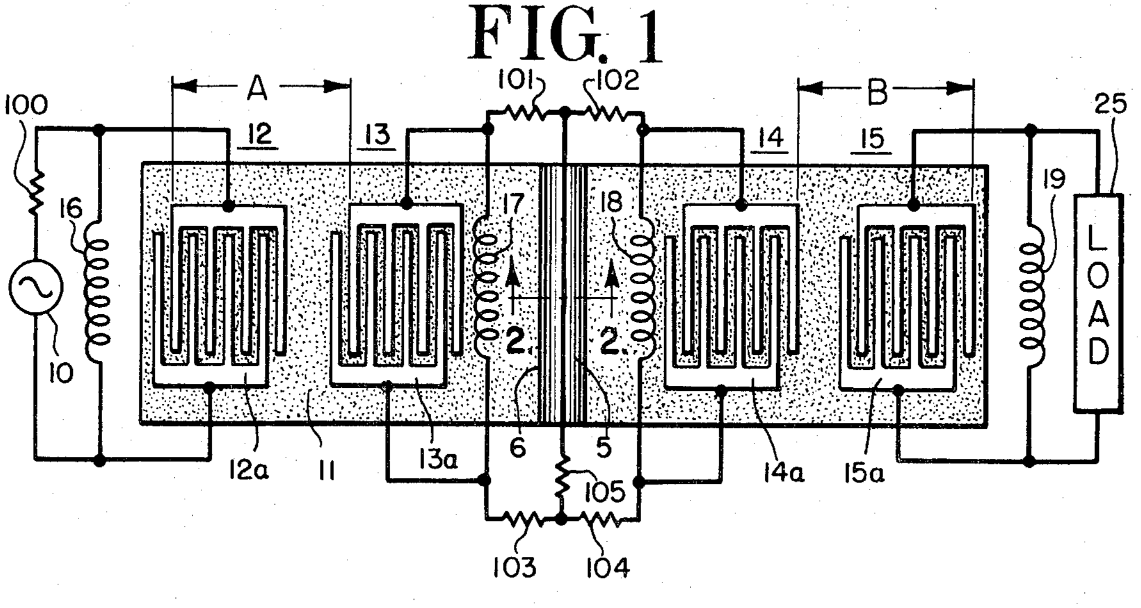
FIG. 1 is a partly schematic plan view of an acousto-electric signal-translating device constituting an embodiment of the invention.

With reference to FIG. 1, a piezoelectric acoustic-wave-propagating medium 11 has four electrode arrays 12*a*, 13*a*, 14*a*, and 15*a*, mechanically coupled to its surface to constitute therewith, respectively, a first-stage input transducer 12, a first-stage output transducer 13, a second-stage input transducer 14, and a second-stage output transducer 15. Each electrode array is constructed of two interleaved comb-type electrodes of a conductive material such as gold, and is vacuum deposited on the plane surface of medium 11 which is a lapped and polished piezoelectric material such as a lead zirconate titanate ceramic (PZT), or a quartz crystal. Maximum amplitude response is achieved for an input signal of such frequency that its wavelength, for surface waves in the material of which medium 11 is composed, is twice the distance between the center of two adjacent teeth in an electrode array. For use in a 40 mHz. television intermediately-frequency amplifier, and using a PZT substrate, for example, this distance is in the order of .002 inch.

An input signal source 10 with a suitable internal impedance 100 is connected across the input transducer 12. Transducers 13 and 14 are electrically connected to each other by means of a resistor network consisting of resistors 101, 102, 103, 104 and 105. If desired, transducers 13 and 14 may be directly connected and resistors 101–105 omitted; however, use of such a resistive coupling network having a low attenuation factor is preferred to inhibit or prevent small electrical interactions between the two transducers. At the same time, transducers 13 and 14 are acoustically isolated from each other by an acoustic-wave-absorbing region 6. This region, in this case, is formed by deposition of an acoustic-wave-absorbing material 5, such as rubber cement, on the medium in a strip which traverses the axis of propagation of the surface waves. This material is such that the energy of an acoustic surface wave incident upon it is effectively absorbed or at least severely attenuated. Output transducer 15 has connected to it a suitable load impedance 25. Small coils 16, 17, 18 and 19 (two or three turns in the case of a television intermediate-frequency application using PZT) are preferably connected across transducers 12, 13, 14 and 15, respectively, to tune out the clamped capacity of each transducer. Tuning out the clamped capacitance of a transducer increases its efficiency by making the impedance of the parallel combination of the coil and transducer resistive at the center frequency of the device. It should be pointed out that the stability and Q requirements of these coils are not stringent and their effect on the response of the device is minor; accordingly, these coils may be omitted in many practical applications of the invention.

In accordance with the invention, the inter-transducer spacings A and B are different. Distance A may be any convenient distance; for example, 10 times the wavelength of a center-frequency acoustic surface wave in the device. Distance B differs from A by an odd multiple of one-quarter wavelength of a center-frequency acoustic surface wave in the device. In the case of B being a single one-quarter wavelength greater than A, distance B is 10.25 wavelengths for the example above of A equal to 10 wavelengths. In this example, the one-quarter wavelength differential distance contributes an additional degree of attenuation amounting to only one-fortieth of the total attenuation and therefore is negligible.

In operation, direct piezoelectric surface-wave transduction is accomplished by the input transducer 12 comprising the spatially periodic electrodes 12*a*. Periodic electric fields are produced along the comb array when a signal from signal source 10 is applied to electrodes 12*a*. These fields cause perturbations or deformations of the surface of medium 11 by piezoelectric action. Efficient generation of surface waves occurs when the strain components produced by the electric fields in the piezoelectric substrate 11 substantially match the strain components associated with the surface-wave mode. The mechanical perturbations travel along the surface as Rayleigh waves representative of the input signal. Signal source 10, for example the output circuit of the converter of a superheterodyne television receiver, produces a range of signal frequencies, but due to the selective nature of the arrangement, only a signal wave of a particular frequency and its intelligence-carrying sidebands are converted to surface waves.

The potential impressed between the interleaved comb electrodes produces two surface waves traveling along the surface of medium 11 in opposite directions away from the teeth. The surface wave propagating along the medium to the right of the input transducer 12 couples to the first-stage output transducer 13 and is converted to an electrical signal which is directly applied to the second-stage input transducer 14. The surface wave traveling to the left of the input transducer 12 intercepts the end of the medium. The effects produced by the acoustic energy reflected at the end of the medium may be minimized by providing acoustic absorbers (not shown, but may be constructed with material similar to the acoustic-wave-absorbing material 5 used in region 6) on the end of medium, or by serrating the end to disperse any such undesired or unused surface-wave energy.

However, as mentioned previously, not all of the acoustic energy arriving at a transducer is converted to electrical energy. A portion of the unconverted energy is transmitted through the transducer and the remaining energy is reflected by the transducer. This reflected energy, if not dealt with, produces spurious and undesirable output signal components.

A surface-wave filter is analogous to a transmission line, and a reflected wave in a surface-wave filter may be compared to the reflected wave caused by a discontinuity in a transmission line. Thus, one may use conventional transmission line technology to eliminate the reflected waves. That is, just as a transmission line may be terminated with an impedance such that reflected signals are generated at this terminating impedance which cancel reflected signals generated by an intermediate impedance across the line, one may terminate the surface-wave filter such that reflected surface waves are generated at the termination which substantially cancel the reflected surface waves generated at the output transducer.

From a practical standpoint, however, this technique is not as easy to do as it may seem. Whatever method is used to terminate the end of the surface-wave filter, for example slanting the edge of the substrate or depositing a piece of reflecting material at the end of the substrate, it is necessary to mechanically position the transducer rather precisely with respect to the terminating device. In a television intermediate-frequency amplifier application using a PZT substrate, the wave-length of the surface waves in the substrate is in the order of .002 inch. This means that the transducer must be located with respect to the ends of the filter at a distance accurate to the nearest .0002 inch. Obviously, this is not easily done, especially on a mass-production basis. The inter-transducer spacing, on the other hand, can be rather precisely accomplished by a somewhat easier photographic method.

Referring again to the unconverted acoustic energy, the energy transmitted through the first-stage output transducer 13 intercepts the region 6 where it is absorbed. The reflected energy propagates from the first-stage output transducer 13 in the form of a surface wave and intercepts the input transducer 12 where it is again reflected, in further attenuated form, back along the path toward transducer 13. Although the amplitude of this double-reflected surface wave is quite small relative to that of the original transmitted surface wave, it may still be large enough to create an undesired reflected signal which, in the aforementioned television application, results in a "ghost" in the picture.

The resistor network connected between the first and second intermediate transducers may be selected to obtain any desired value of attenuation, or it may be replaced with a direct electrical connection. For example, if the values of resistors 101, 102, 103, and 104 are each made equal to 15 ohms and resistor 105 equal to 120 ohms, the impedance of the network is approximately 100 ohms and the attenuation approximately six decibels. This network then provides enough attenuation to isolate any small electrical interactions between the two transducers yet leave the much larger desired electrical signal relatively unaffected.

The resulting electrical signal impressed across the second-stage input transducer 14 corresponds to the superposition of the desired original surface-wave signal and the undesired double-reflected surface-wave signal. The double-reflected signal, of course, is delayed a short time relative to the original signal. In response to each impressed electrical signal component, the second-stage input transducer 14 produces two surface waves in the medium which propagate in opposite directions away from this transducer. The surface waves traveling to the left of transducer 14 are absorbed in the region 6. The first surface wave traveling to the right of transducer 14, corresponding to the original input signal, intercepts the output transducer 15 and causes an electrical signal to be developed therein which is in turn transmitted to the output load 25. Part of this first surface wave continues through the output transducer and, as described in considering the operation of the first transducer pair, part of it is reflected back toward transducer 14. The transmitted surface wave intercepts the end of the medium where it is dispersed or absorbed, depending on the construction of the end. The reflected surface wave propagates back toward transducer 14 and arrives at the same time as the delayed double-reflected electrical signal coming from the first pair of transducers.

When an acoustic surface wave travels a distance in the medium equal to one-quarter of its wavelength, it undergoes a phase shift of 90°. Since, in accordance with the invention, the inter-transducer distance for the second transducer pair differs from the inter-transducer distance for the first transducer pair by an odd multiple of one-quarter wavelength of the acoustic surface wave at its center frequency, the reflected wave, in traversing the second inter-transducer path twice, is delayed a total amount of time corresponding to a total phase shift of 180°, 90° down and 90° back. Thus the reflected surface wave coming from the output transducer and the double-reflected signal component coming from transducer 13 arrive at the second intermediate transducer at the same time but counterphased. The reflected surface wave causes an electrical signal component to be developed in the second-stage input transducer 14 which is equal in amplitude to the double-reflected signal component. Because they are of opposite phase, they effectively cancel each other. This cancellation prevents any reflected signal components from reaching the output of the filter system. Hence, the output signal corresponds to the desired input signal without any appreciable spurious components.

Figure 2:
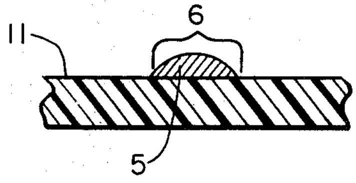
FIG. 2 is a fragmentary sectional view taken along line 2—2 in FIG. 1.

In FIG. 2, a fragmentary sectional view of the substrate 11 taken along the line 2—2 in FIG. 1 shows the acousticwave-absorbing region 6 in greater detail. Although the placing of the acoustic-wave-absorbing material 5 in the region 6 provides for the absorption of all surface waves incident upon it, spurious sub-surface bulk waves also generated by the transducer sometimes propagate through the substrate 11 and interfere with the output signal. To eliminate or at least substantially reduce these bulk waves, an alternative embodiment of the invention may be used as depicted in FIG. 3.

Figure 3:
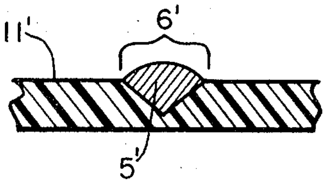
FIG. 3 is a fragmentary sectional view, similar to that of FIG. 2, of another embodiment of the invention.

FIG. 3 is another fragmentary sectional view of a typical substrate 11' including an acoustic-wave-absorbing region 6'. In this embodiment, instead of merely placing some acoustic-wave-absorbing material on the surface of the substrate, a groove is cut in the medium substantially transverse to the direction of propagation of the surface waves and the acoustic-wave-absorbing material is deposited in this groove to substantially absorb any sub-surface waves propagating through the medium at this portion of the substrate. In addition, of course, it absorbs all surface waves incident upon it.

Figure 4:
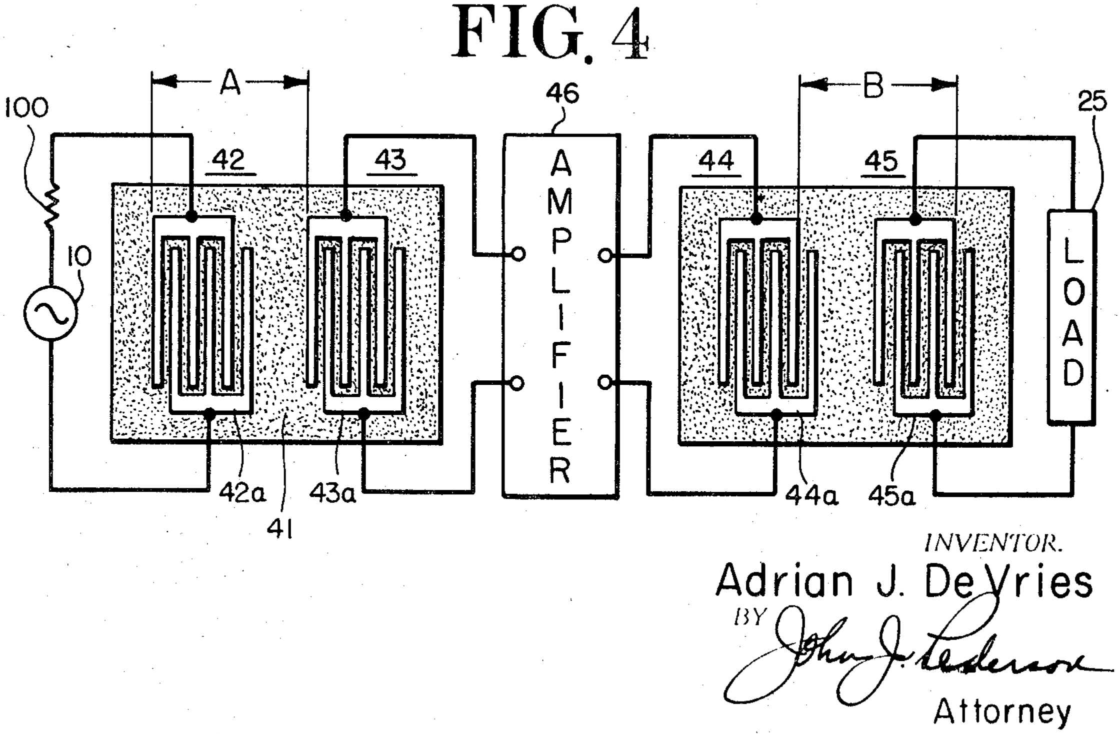
FIG. 4 is a view similar to that of FIG. 1, of another embodiment of the invention.

FIG. 4 illustrates how the concept shown in FIG. 3 can be carried one step further by extending the groove until the medium is severed. Two separate acoustic-wave-propagating mediums are thus formed providing complete acoustic isolation. The two substrates now need not be composed of the same material, but may be different and still yield the same desired results as before. This concept is discussed in greater detail later. In addition, instead of a direct electrical connection, an amplifier 46 may be connected in series between the two filters, thus providing a substantially reflection-free surface-wave filter system with gain. Since such an amplifier increases the amplitude of all input signals proportionally, it does not affect the signal-cancellation operation of the device. Moreover, the difference in signal levels between the two stages does not alter the performance of the device when operated at normal levels (e.g. a few millivolts). Of course, an amplifier may be used in place of resistor network 101–105 in the FIG. 1 embodiment also. Although the embodiment of FIG. 4 does not have the advantage of the embodiment shown in FIG. 1 of having all of the transducers formed on one medium, thereby reducing production costs, it does have the advantage of complete acoustic isolation and physical flexibility.

Figure 5:
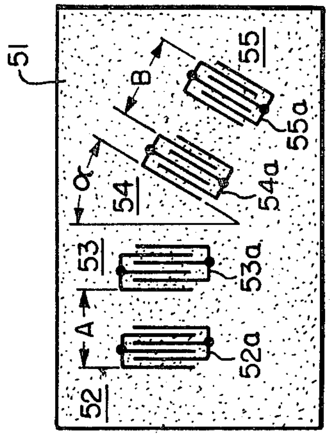
FIG. 5 is a schematic representation of still another embodiment of the invention.

Acoustical isolation may be accomplished by various other means, one of which is represented schematically in FIG. 5. The first pair of transducers 52 and 53, comprising input electrode array 52a and first-stage output electrode array 53a respectively, is acoustically isolated from the second pair of transducers 54 and 55, comprising second-stage input electrode array 54a and output electrode array 55a, by orienting the first pair at an angle $\alpha$ with respect to the second pair. This angle may be small (in the order of two degrees) and may be calculated from the following approximate equation:

$$\frac{P\lambda}{L}$$

where $\alpha$ is the angle in radians, P is any integer, $\lambda$ is the acoustic wavelength of the center-frequency surface wave in the medium, and L is the length of an electrode array element measured in the direction transverse to the axis of surface wave propagation. The units of these last two quantities are the same (length). An incident wavefront can be considered to be composed of small incremental transverse segments, each of which, upon interception with a transducer at an angle other than 90°, develops an electrical potential therein having the same magnitude but a different phase. The above equation determines the angles $\alpha$ at which the summation of the electrical potentials so produced by these segments is zero. As a result of such orientation, surface waves in both stages are effectively isolated each from the other.

Figure 6:
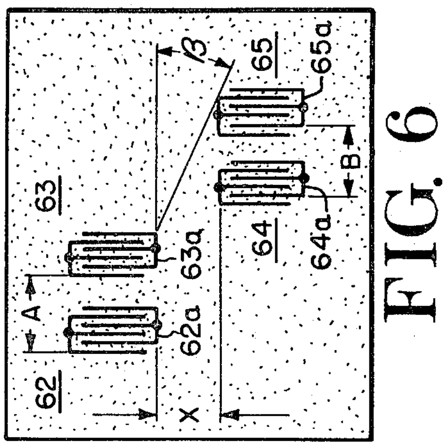
FIG. 6 is a similar schematic representation of yet another embodiment of the invention.

FIG. 6 is a schematic representation of still another embodiment in which acoustical isolation is provided in still another way. The first stage transducers 63, 63 (comprising electrode arrays 62a and 63a) are transversely displaced with respect to the second pair 64, 65 (Comprising electrode arrays 64a and 65a) on a common substrate, with parallel orientation of the surface wave propagation paths of the respective first and second stages. With this construction, the first-stage surface waves bypass the second-stage transducers 64 and 65. Hence, no surface waves can propagate from the first-stage output transducer to the second-stage input transducer. Instead, all surface waves transmitted to the right of the first-stage output transducer intercept the end of the medium and are absorbed or dispersed according to the construction of the end.

It should be noted that, while the transducers propagate surface waves essentially in a lateral direction, there is a small amount of dispersion similar to that of a unidirectional antenna. Accordingly, the two stages in FIG. 6 should be transversely displaced by a certain minimum distance, X, as shown in FIG. 6. This distance X is such that the dispersed surface wave energy from the first stage clears the output transducer of the second stage and it may be readily calculated using conventional trigonometry when the angle of dispersion, $\beta$ is known. $\beta$ may be calculated from the following equation:

$$\beta=\frac{\lambda}{L}$$

where $\lambda$ is the acoustic wavelength of the center-frequency surface wave in the medium and L is the length of a transducer as measured in the direction transverse to that of wave propagation.

Although a two-stage filter has been shown and described above, this invention is not limited to the series combination of two filters. Any number of filter stages may be connected in series to obtain the same results. Of course the intertransducer spacings for each filter must be altered according to the total number of filters connected in series in the system. The spacings are selected such that the summation of all reflected surface wave components is zero at the last filter in the series. A combination of reflection-free filter systems may also be used. Such a multi-stage embodiment may find particular usefulness in an intermediate-frequency amplifier system requiring signal amplification in addition to signal selectivity, as for example in a television receiver where three-stage and four-stage IF systems are common.

Figure 7:
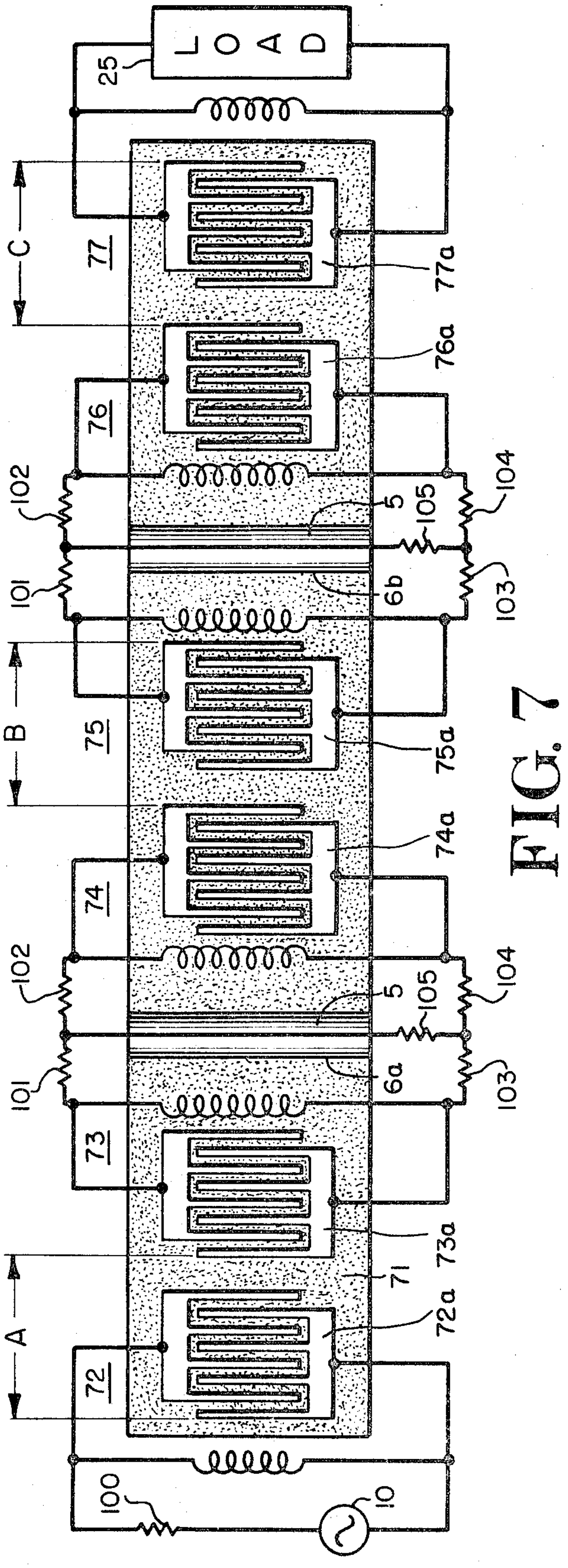
FIG. 7 is a view similar to that of FIG. 1 of an additional embodiment of the invention.

In FIG. 7, a three-stage filter system is used to illustrate an example of a multi-stage embodiment of the invention. The first two pairs of transducers 72–73 and 74–75, comprising electrode arrays 72a–73a and 74a–75a, respectively, are same as in the embodiment shown in FIG. 1. Once again it should be noted that an amplifier or other electrical connection means may be substituted for the resistor network. An additional pair of transducers 76 and 77, comprising electrode arrays 76a and 77a, however, is added to the substrate 71 and connected to electrode array 75a by means of a resistor network. The first and second pairs of transducers are acoustically isolated by an acoustic-wave-absorbing region 6a which may be constructed in various ways as mentioned previously. The same is true for the second and third transducer pairs utilizing region 6b. A load 25 is connected to the output electrode array 77a for utilization of the electrical signals developed by the output array. With the incorporation of the additional pair of transducers, the spacings B and C are altered such that the difference in the spacings A, B, and C create the proper phase relationships with respect to the surface wave reflection components. The proper phase relationships are those which, when all of the first-order reflected-signal components arrive at the last (in this case the third) filter stage, cause the vector summation of the reflected-signal components therein to be zero. All higher-order reflected signal components, created when a reflected signal component propagates through a subsequent filter stage and creates further (higher-order) reflected signal components, are of such small magnitude so as to be negligible. Thus, each spacing is determined according to the total number of stages in the system (N) and the location of the particular stage ($n$) in the system; once the spacings are determined, the sequence of the stages is irrelevant. Each distance may be calculated from the following equation:

$$D_n=D_o+\frac{\lambda}{2}\left(\frac{n}{N}\pm P\right)$$

where $D_n$ is the inter-transducer distance for the particular stage ($n$), $D_o$ is any convenient distance, N is the total number of filter stages in the system, $\lambda$ is the wave-elngth of the center-frequency acoustic surface wave, and P is any integer, preferably zero.

For example, in the three-stage embodiment of the invention, as shown in FIG. 7, the inter-transducer spacings calculated from the above equation and selecting P=0 are as follows:

$$A=D_o+\frac{\lambda}{2}\left(\frac{1}{3}\right)=D_o+\frac{\lambda}{6}$$

$$B=D_o+\frac{\lambda}{2}\left(\frac{2}{3}\right)=D_o+\frac{\lambda}{3}$$

$$C=D_o+\frac{\lambda}{2}\left(\frac{3}{3}\right)=D_o+\frac{\lambda}{2}$$

Since $\lambda$ is the wavelength of the center-frequency acoustic surface wave, an application of this invention used in a television intermediate-frequency amplifier operating at 40 mHz, and using a PZT substrate with $D_o=10\lambda$ has the distances A, B, and C equal to 0.0203 in., 0.0207 in., and 0.0210 in., respectively. The values of A, B, and C may be interchanged without affecting the results. The integer P is preferably selected to be zero to obtain the broadest bandwith and minimum attenuation; the arbitrary distance $D_o$ is made 10 wavelengths, for example, in order to minimize the differences in attenuation characteristics due to the different distances, in the various stages, which was discussed previously.

Having determined the proper inter-transducer spacings A, B, and C the operation of this three-stage filter system is much the same as the two-stage filter system shown in FIG. 1. An input signal from signal source 10 is applied to the input electrode array 72a, as the input signal travels through the filter system, double-reflected surface waves are generated in both the first and second stages. A once-reflected surface wave is created in the final (third) stage. Since the spacings have been made the correct distance to produce the proper phase relationships for these reflected surface waves, the vector summation of these reflected waves is zero because they arrive at the transducer 76 at the same time, with the same magnitudes, and phased in such manner as to add to zero. That is, each component is 120° out of phase with respect to the other.

In each of the foregoing embodiments, different actual physical inter-transducer spacings are provided in successive stages, to bring about the desired phase shift in the two stages by predetermined, different amounts. It is not necessary, however, to use different actual spacings to achieve the benefits of the invention, because the acoustic wave velocity can be modified to change the effective inter-transducing spacing. This may be accomplished by using different materials for the substrates of the different filter stages by using surface damping layers of appropriate composition and thickness as by spraying a thin coat of lacquer on the substrate which introduces a velocity change by mass loading the substrate. Slowing down the acoustic wave propagation velocity is equivalent to increasing the physical spacing and hence results in a corresponding increase in the effective spacing between the input and output transducers.

While optimum inhibition or cancellation of the undesired reflected signal components requires that the inter-transducer spacings be proportioned to provide total cancellation of the undesired signal components by the additionally developed reflected waves, there are of course many practical applications in which less than total cancellation is required. For example, in applying the invention to the intermediate-frequency amplifier of a television receiver, reduction of the signal level of the reflected-wave output signal components to a level 30 decibels below the level of the desired or primary output signal components at the output transducer is sufficient to eliminate undesirable "ghosts" (which result from the reflected signal components) from the reproduced image. In such applications, therefore, the inter-transducer spacings may be designed to provide less than complete signal cancellation for the sake of achieving reduced manufacturing costs and/or to permit greater flexibility in overall filter design.

Thus the invention provides a new and improved solid-state surface-wave filter which has substantial advantages over predecessor devices. It provides simply and efficiently for the elimination of the effects of undesired reflected signals inherent in conventional acousto-electrical translating devices. The entire physical structure can be constructed of such small size as to be particularly useful in conjunction with solid-state integrated circuitry.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A multi-stage solid state surface-wave signal-translating system comprising:

acoustically isolated first and second tuned acousto-electrical surface-wave filter stages each comprising an input surface-wave transducer coupled to an acoustic-surface-wave-propagating medium and responsive to an applied electrical signal of a predetermined center frequency for establishing acoustic surface waves of a predetermined acoustic wavelength in the medium, and each further comprising an output surface-wave transducer coupled to the medium and spaced from its associated input transducer in the direction of acoustic surface-wave propagation therein, each output transducer being responsive to acoustic surface waves in the medium for developing an electrical signal corresponding thereto;

coupling means for impressing the electrical signals developed by the output transducer of said first filter stage on the input transducer of said second filter stage;

and the input and output transducer of said second filter stage having an effective spacing in the direction of acoustic surface-wave propagation of a distance differing from the effective spacing between the input and output transducers of said first filter stage by an amount substantially equal to an odd multiple of one-quarter of said acoustic wavelength to provide substantial attenuation of spurious signal components attributable to acoustic surface wave reflections in said filter stages.

2. A multi-stage solid state surface-wave signal-translating system as defined in claim 1, in which said coupling means includes electronic amplifying means for providing signal gain in said system.

3. A multi-stage solid state surface-wave signal translating system as defined in claim 1, in which said coupling means includes a resistor pad network for providing a small amount of electrical isolation.

4. A multi-stage solid state surface-wave signal-translating system as defined in claim 1, in which a continuous common substrate constitutes the acoustic-surface-wave-propagating medium of both said filter stages.

5. A multi-stage solid state surface-wave signal-translating system as defined in claim 4, in which said filter stages are offset to provide acoustical isolation between said filter stages.

6. A multi-stage solid state surface-wave signal-translating system as defined in claim 4, in which said second filter stage is tilted relative to said first filter stage to provide acoustical isolation between said filter stages.

7. A multi-stage solid state surface-wave signal-translating system as defined in claim 6, in which the angle of tilt ($\alpha$) is determined by the equation:

$$\alpha=\frac{P\lambda}{L}$$

where P is any integer, $\lambda$ is the acoustic wavelength of the center-frequency acoustic surface wave in the medium, and L is the length of a transducer as measured in a transversal direction.

8. A multi-stage solid state surface-wave signal-translating system as defined in claim 1, in which means for varying the velocity of the acoustic surface waves are provided, thereby establishing the required effective spacing to create the desired phase shift.

9. A multi-stage solid state surface-wave signal-translating system comprising:

a plurality of N acoustically isolated tuned acousto-electric surface-wave filter stages each comprising an input surface-wave transducer coupled to an acoustic-surface-wave-propagating medium and responsive to an applied electrical signal of a predetermined center frequency for establishing acoustic surface waves of a predetermined acoustic wavelength in the medium, and each further comprising an output surface-wave transducer coupled to the medium and spaced from its associated input transducer in the direction of acoustic surface wave propagation therein, each output transducer being responsive to acoustic surface waves in the medium for developing an electrical signal corresponding thereto;

coupling means for impressing the electrical signal developed by the output transducer of each stage of said plurality of filter stages on the input transducer of the next stage of said plurality of filter stages;

and the input and output transducers of each of said plurality of filter stages having an effective spacing in the direction of acoustic surface-wave propagation of a distance as determined by the equation:

$$D_n = D_o + \frac{\lambda}{2}\left(\frac{n}{N} \pm P\right)$$

where $D_n$ is said distance for the particular stage ($n$) of said plurality of filter stages (N), $D_o$ is any convenient distance, $\lambda$ is the wavelength of the center-frequency acoustic surface wave, and P is any integer, to thereby provide substantial attenuation of spurious signal components attributable to acoustic surface wave reflections in said filter stages.

References Cited

UNITED STATES PATENTS

| | | | |
|---|---|---|---|
| 3,446,975 | 5/1969 | Adler et al. | 250—211 |
| 3,376,572 | 4/1968 | Mayo | 343—17.2 |

| | | | |
|---|---|---|---|
| 2,097,458 | 11/1937 | Hansell | 333—72 |
| 3,283,264 | 11/1966 | Papadakis | 333—6 |
| 3,401,360 | 9/1968 | Schulz-Dubois | 333—30 |
| 3,360,749 | 12/1967 | Sittig | 333—30 |

OTHER REFERENCES

C. Tseng: Journal of Applied Physics, vol. 38, October 1967, pp. 4281–83, "Surface Waves on . . . Cds, Zno, PZT–4."

HERMAN KARL SAALBACH, Primary Examiner

C. BARAFF, Assistant Examiner

U.S. Cl. X.R.

333—30